United States Patent
Kondo (10) Patent No.: US 7,580,343 B2
(45) Date of Patent: Aug. 25, 2009

(54) INFORMATION RECORDING MEDIUM

(75) Inventor: Tetsuya Kondo, Kanagawa (JP)

(73) Assignee: Victor Company of Japan, Limited, Yokohama (JP)

(*) Notice: Subject to any disclaimer, the term of this patent is extended or adjusted under 35 U.S.C. 154(b) by 0 days.

(21) Appl. No.: 11/876,039

(22) Filed: Oct. 22, 2007

(65) Prior Publication Data

US 2008/0049593 A1 Feb. 28, 2008

Related U.S. Application Data

(60) Continuation of application No. 11/432,477, filed on May 12, 2006, now abandoned, which is a continuation of application No. 11/157,856, filed on Jun. 22, 2005, now Pat. No. 7,072,284, which is a continuation of application No. 10/776,322, filed on Feb. 12, 2004, now Pat. No. 6,925,050, which is a division of application No. 10/435,057, filed on May 12, 2003, now Pat. No. 6,744,725, which is a division of application No. 09/825,324, filed on Apr. 5, 2001, now Pat. No. 6,582,793.

(30) Foreign Application Priority Data

| Apr. 10, 2000 | (JP) | ............................. 2000-107736 |
| Jul. 26, 2000 | (JP) | ............................. 2000-225094 |

(51) Int. Cl.
*G11B 7/24* (2006.01)
*B32B 3/02* (2006.01)

(52) U.S. Cl. ............... 369/275.4; 369/275.3; 428/64.1

(58) Field of Classification Search ... 369/275.1–275.5, 369/283, 288, 286, 44.13, 44.29, 53.41, 47.28; 428/64.1–64.5

See application file for complete search history.

(56) References Cited

U.S. PATENT DOCUMENTS

| 6,163,521 | A  | 12/2000 | Konishi |
| 6,246,656 | B1 | 6/2001  | Kawakubo et al. |
| 6,269,070 | B1 | 7/2001  | Kikuchi et al. |
| 6,335,916 | B1 | 1/2002  | Endo et al. |
| 6,411,575 | B1 | 6/2002  | Akiyama et al. |
| 6,442,119 | B1 | 8/2002  | Sunagawa |
| 6,580,678 | B2 | 6/2003  | Kondo et al. |

(Continued)

FOREIGN PATENT DOCUMENTS

JP   03-054744/1991   3/1991

(Continued)

*Primary Examiner*—Ali Neyzari
(74) *Attorney, Agent, or Firm*—Connolly Bove Lodge & Hutz LLP (57) ABSTRACT

In an information recording medium comprising at least a substrate, a recording layer, and a resin layer, the substrate is formed with at least a pit corresponding to a read only area 31 and a groove corresponding to a recording/reproducing area 32 without overlapping with each other. A reflectivity of the recording layer is specified to be more than 10%. The recording layer and the resin layer are continuously adhered over both the read only and recording/reproducing areas 31 and 32. The information recording medium is characterized in that both push-pull signal outputs T1 and T2, which are reproduced from the read only area 31 and the recording/reproducing area 32 respectively, are more than 0.1 and satisfy an inequality $1.5 \geq T1/T2 \geq 0.5$.

2 Claims, 7 Drawing Sheets

U.S. PATENT DOCUMENTS

| | | |
|---|---|---|
| 6,925,050 B2 | 8/2005 | Kondo |
| 6,930,977 B1 | 8/2005 | Kondo et al. |
| 7,012,860 B2 | 3/2006 | Kondo |
| 7,035,199 B2 | 4/2006 | Kondo |
| 7,072,284 B2 | 7/2006 | Kondo |
| 7,193,938 B2 | 3/2007 | Kondo |
| 7,197,006 B2 | 3/2007 | Kondo |
| 7,397,756 B2 * | 7/2008 | Kondo .................... 369/275.4 |
| 2001/0005357 A1 | 6/2001 | Ha |
| 2002/0006104 A1 | 1/2002 | Sato |
| 2006/0109777 A1 | 5/2006 | Kondo |
| 2007/0133384 A1 | 6/2007 | Kondo |

FOREIGN PATENT DOCUMENTS

| | | |
|---|---|---|
| JP | 04-243019/1992 | 8/1992 |
| JP | 05-166229 A | 7/1993 |
| JP | 05-298697/1193 | 11/1993 |
| JP | 09-326138/1997 | 12/1997 |
| JP | 10-172149/1998 | 6/1998 |
| JP | 10-241260/1998 | 9/1998 |
| JP | 2000-348388 A | 12/2000 |

* cited by examiner

Fig. 13

INFORMATION RECORDING MEDIUM

CROSS-REFERENCE APPLICATIONS

The present application is a Continuation Application of U.S. application Ser. No. 11/432,477 filed May 12, 2006, which is a Continuation Application of U.S. application Ser. No. 11/157,856 filed Jun. 22, 2005; which is Continuation Application of U.S. application Ser. No. 10/776,212 filed Feb. 12, 2004; which is a Divisional Application of U.S. application Ser. No. 10/435,257 filed May 12, 2003; which is a Divisional Application of U.S. application Ser. No. 09/825,924 filed Apr. 5, 2001; which claims priority to Application No. 2000-107736 filed in Japan on Apr. 10, 2000 and Application No. 2000-225094 filed in Japan on Jul. 26, 2000. The entire contents of each of these applications are fully incorporated herein by reference.

BACKGROUND OF THE INVENTION

1. Field of the Invention

The present invention relates to an information recording medium utilized for an optical recording/reproducing apparatus, which reads out information recorded on the information recording medium by making the information recording medium relatively move, particularly, relates to an information recording medium comprising a read only area of enabling to read out information and a recording/reproducing area of enabling to record and reproduce information.

2. Description of the Related Art

Currently various types of information recording mediums such as in a disk shape, in a card shape, and in a tape shape are utilized as an optical information recording medium from which information is read out by making the information recording medium relatively move. Such information recording mediums are divided into two types in consideration of mechanism of recording or reproducing: one is a read only type and the other is a recording/reproducing type, that is, a recordable type and an overwritable type. A read only type information recording medium is shipped out into a market with being prerecorded with information such as a CD audio disk typically, and is reproduced by a user. On the other hand, a recordable or overwritable type information recording medium is shipped out into a market without any recorded information, and a user records information on it and reproduces it if necessary.

A problem arises along with a trend toward multimedia causing to increase a chance such that copyright is infringed by using an electronic means. Accordingly, in order to prevent such the problem, an idea such as embedding a specific code, which can not be rewritten by a user, is necessary to be realized even in a recordable or overwritable type information recording medium, which can be recorded freely by a user.

As mentioned above, various kinds of information recording mediums, which are provided with two areas composed of a read only area and a recording/reproducing area, have been introduced. For example, there is existed an information recording medium provided with a recording/reproducing area only in a predetermined angle. Further, another information recording medium having a recording/reproducing area, which is provided with a read only area allocated in each one half track, is introduced.

Figure 2:
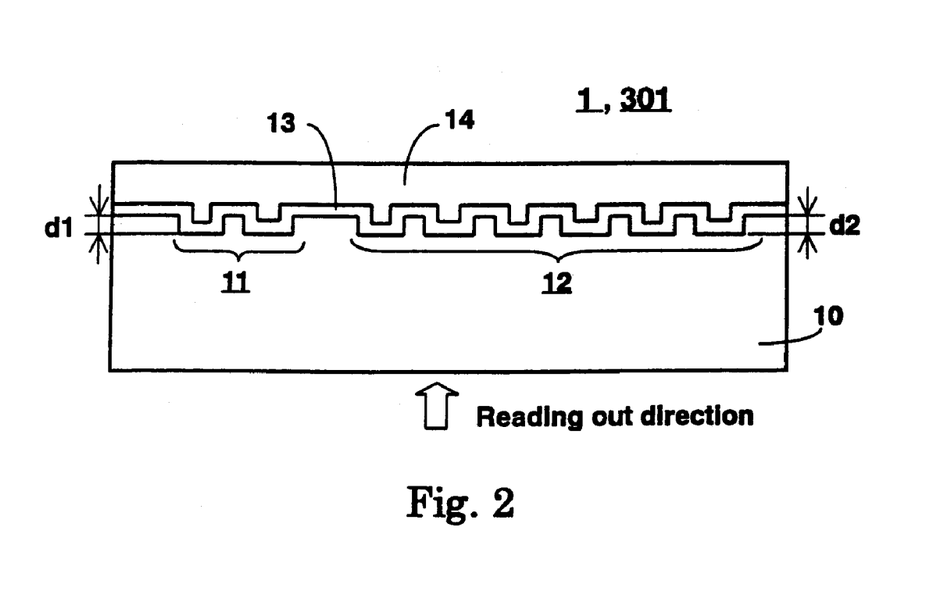
FIG. 2 is a cross sectional view of an information recording medium common to a prior art and the present invention.

Furthermore, an information recording medium provided with both a read only area and a recording/reproducing area, which are allocated in different positions from each other, is introduced. FIG. 2 is a cross sectional view of such the information recording medium 301. In FIG. 2, the information recording medium 301 comprises a substrate 10, a recording layer 13, and a resin layer 14. A microscopic pattern is formed on a surface of the substrate 10 at a boundary area between the substrate 10 and the recording layer 13. Microscopic patterns constituting a read only area and a recording/reproducing area are engraved in areas corresponding to the read only and recording/reproducing areas respectively. Actually, microscopic patterns 11 corresponding to the read only area and other microscopic patterns 12 corresponding to the recording/reproducing area are engraved. These microscopic patterns 11 and 12 are different from each other in depth. A depth "d1" of the microscopic patterns 11 is $\lambda/4n$, on the other hand, a depth "d2" of the microscopic patterns 12 is $\lambda/8n$, wherein $\lambda$ is a reproduction wavelength of a laser beam and "n" is a refractive index of the substrate 10 at the reproduction wavelength $\lambda$. Specifying the depth of the microscopic patterns 11 to $\lambda/4n$ is caused by a phase depth in which a signal output from the read only area becomes maximum. Further, specifying the depth of the microscopic patterns 12 to $\lambda/8n$ is caused by that a push-pull signal related to tracking of the information recording medium becomes a maximum output.

As mentioned above, allocating two areas in different positions reduces load of a recording/reproducing apparatus due to a simplified layout. Accordingly, there is much merit.

However, there is existed a following problem of the prior art mentioned above. A defect has occurred when an information recording medium formed with microscopic patterns shown in FIG. 2 has been loaded in various recording/reproducing apparatuses, which are currently available in a market, and operated. A mode of the defect is out of tracking while reproducing the information recording medium with continuously traversing from a recording/reproducing area to a read only area. Further, an operation traversing reversely from the read only area to the recording/reproducing area is also defective. According to our careful investigation of the problem, it is found that a recording/reproducing apparatus employs a push-pull method for tracking so as to record information in a groove and the push-pull method does not match with the information recording medium 301. In other words, firstly, the problem is caused by that forming the read only area in the depth of $d1=\lambda/4n$ results a push-pull signal output in zero. In a case that the push-pull signal output is zero, a track can not be detected. Therefore, the reproduction stops at the track. Further, as a second problem, output difference between a push-pull signal output of the read only area and a push-pull signal output of the recording/reproducing area is large, so that a servo system of the recording/reproducing apparatus can not follow properly. Accordingly, it is required to solve such the problem as out of tracking when an information recording medium having two areas is actually recorded and reproduced.

SUMMARY OF THE INVENTION

Accordingly, in consideration of the above-mentioned problems of the prior art, an object of the present invention is to provide an information recording medium, which can solve the problem mentioned above.

In order to achieve the above object, the present invention provides, according to an aspect thereof, an information recording medium, which comprises a substrate, a recording layer, and a resin layer, wherein the substrate is formed with a pit corresponding to a read only area and a groove corresponding to a recording/reproducing area without overlapping with each other, and wherein a reflectivity of the recording layer is more than 10%, the information recording medium is characterized in that a push-pull signal output T1 reproduced from the read only area and another push-pull signal output T2 reproduced from the recording/reproducing area is more than 0.1 respectively and further 1.5≧T1/T2≧0.5.

Other object and further features of the present invention will be apparent from the following detailed description when read in conjunction with the accompanying drawings.

DETAILED DESCRIPTION OF THE PREFERRED EMBODIMENTS

With referring to drawings, details common to all embodiments of the present invention are explained first.

Figure 1:
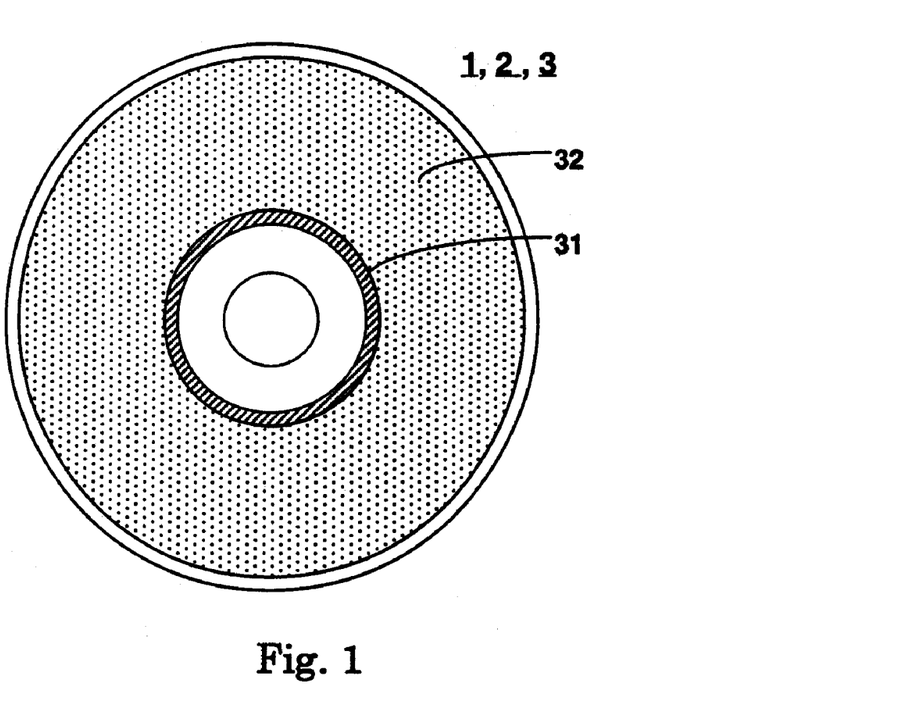
FIG. 1 is a plan view of an information recording medium in a disk shape according to an embodiment of the present invention.

FIG. 1 is a plan view of an information recording medium in a disk shape according to an embodiment of the present invention.

FIG. 2 is a cross sectional view of the information recording medium shown in FIG. 1.

Figure 3:
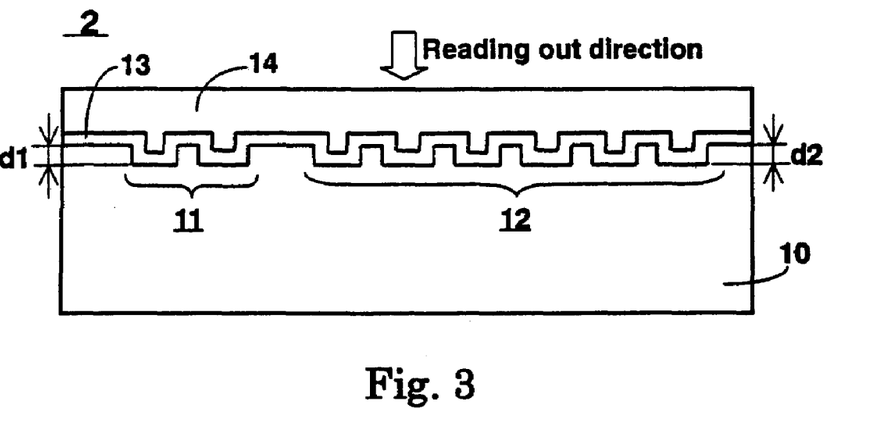
FIG. 3 is a cross sectional view of an information recording medium according to the present invention.

FIG. 3 is another cross sectional view of the information recording medium shown in FIG. 1.

In FIG. 1, an information recording medium 1 in a disk shape comprises a read only area 31 and a recording/reproducing area 32. As shown in FIG. 1, the read only area 31 and the recording/reproducing area 32 is allocated in an innermost circumference area and an outer circumference area of the information recording medium 1 respectively. However, these allocations can be reversely arranged. Further, these two areas are formed not so as to overlap with each other. Some gap existing between two areas can be allowable. Furthermore, a plurality of the read only and recording/reproducing areas 31 and 32 can also be allowable.

FIG. 2 shows a fundamental configuration of an information recording medium 1 of the present invention. The information recording medium 1 of the present invention is resemble to that of the prior art in appearance, so that the same drawing is used for explaining the present invention. FIG. 3 also shows a fundamental configuration of an information recording medium 2 of the present invention. The configuration shown in FIG. 3 is a same as that shown in FIG. 2 except a reading out direction, that is, an optical path. An optical path will be explained.

As shown in FIGS. 2 and 3, the information recording medium 1 or 2 comprises a substrate 10, a recording layer 13 and a resin layer 14. A microscopic pattern is formed on a surface of the substrate 10 at a boundary between the substrate 10 and the recording layer 13. Microscopic patterns 11 and 12 are formed in areas corresponding to the read only area 31 and the recording/reproducing area 32 respectively without overlapping with each other.

Further, these microscopic patterns 11 and 12 have a depth of "d1" and "d2" respectively. Either cases can be acceptable whether or not the depth "d1" of the microscopic patterns 11 is a same as the depth "d2" of the microscopic patterns 12. However, a depth must be designated so as to be able to obtain a range of push-pull signal output, which will be depicted.

Layers composed of the substrate 10, the recording layer 13, and the resin layer 14 are formed in parallel to each other. The resin layer 14 is adhered on the recording layer 13 with continuously covering over all areas including at least the read only area 31 and the recording/reproducing area 32. Although recording or reproducing by light beam is performed on the recording layer 13, it is arbitrarily determined that a laser beam having a wavelength of λnm, which is stopped down by a objective lens having a numerical aperture of NA, is irradiated from either side of the information recording medium 1. In other words, it is arbitrarily determined whether the laser beam is irradiated from the substrate 10 side or the resin layer 14 side. Further, a path of irradiating the laser beam, that is, an optical path has a certain refractive index "n" for the wavelength λ. An effective optical length is determined by the refractive index "n". The substrate 10 is illustrated as an optical path in FIG. 2. However, the resin layer 14 can be used as an optical path as shown in FIG. 3. The refractive index "n" of these optical paths is desirable to be 1.4 through 1.7 in consideration of interchangeability with current optical disks, more desirable to be 1.45 through 1.65. Further, if birefringence of the optical path is designated to be less than 100 nm by double paths, deviation of reproduction output can be sufficiently suppressed, so that it is most desirable.

Synthetic resins of high strength and various ceramics can be utilized for a material of the substrate 10. Actual materials are such resins as polycarbonate, polymethyle methacrylate, polystyrene, polycarbonate-polystyrene copolymer, polyvinyl chloride, alicyclic polyolefin, polymethyle pentene, polyacetate resin, and various copolymer having a resin frame of them, and such synthetic resin as block polymer, and such ceramics as soda aluminosilicate glass, boron silicate glass, and silica glass.

Further, the recording layer 13 is at least made of a recording material of which a reflectivity is more than 10% at the wavelength λ. Actually, following materials can be used for a recording material of enabling recordable or write once recording: such dye materials as cyanine dye, phthalocyanine dye, naphthalocyanine dye, azo dye, and naphthoquinone dye. Furthermore, a phase change recording material, so called, and a magneto-optical recording material can be used for a recording material of enabling overwrite. Typical phase change recording materials are as follows: alloys made of some materials selected from indium, antimony, tellurium, selenium, germanium, gallium, bismuth, platinum, gold, silver, copper, tin, sulfur, and aluminum, wherein an alloy includes compound such as oxide, nitride, and carbide. Moreover, in a case of magneto-optical recording material, there existed an alloy, which contains at least a transition metal and a rare earth element. The alloy is made of some materials selected from terbium, cobalt, iron, gadolinium, neodymium, dysprosium, bismuth, palladium, samarium, holmium, praseodymium, manganese, titanium, erbium, ytterbium, lutetium, chromium, tin, platinum, wherein an alloy includes compound such as oxide, nitride, and carbide. In addition thereto, the recording layer 13 can be multi-layered or laminated by an optical interference film such as SiN, SiC, SiO, ZnS, ZnSSiO, AlO, GeN, MgF, InO, and ZrO, and an optical reflection film such as aluminum, gold, silver, and titanium for a purpose of improving performance. In order to perform high density recording and reproducing, the recording layer 13 can be laminated by a super resolution masking film or a contrast enhancing film, which is commonly known.

The resin layer 14 is provided for protecting the recording layer 13 chemically and physically, and can be selected from thermosetting resins, ultra violet ray curable resins, various radiation including visible light curable resins, electron beam curable resins, moisture curable resins, and multiple liquid mixture curable resins. A surface of the resin layer 14 can be printed if necessary.

Figure 5:
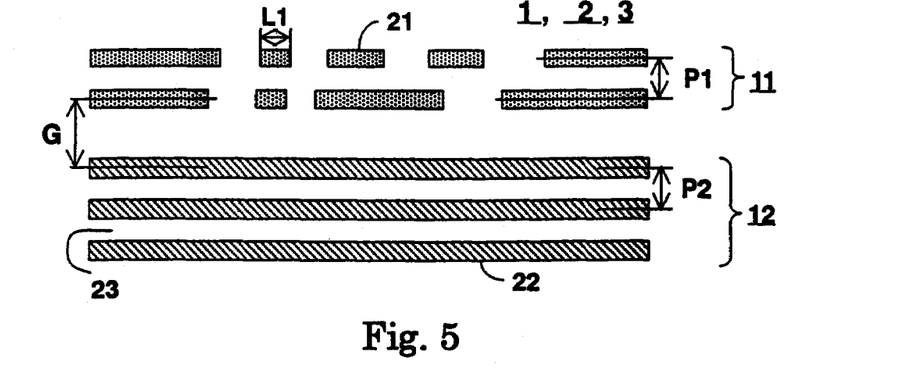
FIG. 5 is a plan view of a boundary area between a read only area and a recording/reproducing area of an information recording medium according to the present invention.

FIG. 5 is a plan view of a boundary area between a read only area and a recording/reproducing area of an information recording medium partially enlarged according to the present invention. There existed a gap having a distance of "G" (hereinafter referred to a gap "G") between the read only area 31 and the recording/reproducing area 32 caused by a manufacturing process of the information recording medium 1. In other words, as shown in FIG. 5, the gap "G" exists between the microscopic patterns 11 of the read only area 31 and the microscopic patterns 12 of the recording/reproducing area 32. Basically, a recording/reproducing apparatus can jump across the gap "G" by forcing to drive a pickup or a like. According to our experiment, the jumping motion can be smoothly performed by setting the gap "G" in less than 25 μm.

As shown in FIG. 5, the microscopic patterns 11 of the read only area 31 is a group of pit 21, which is engraved by what is called a recording method of cutting. A track is composed of continuing groups of the pit 21. The microscopic patterns 12 utilized for the recording/reproducing area 32 are not formed in the read only area 31. A gap between each track is in a distance of P1 (hereinafter referred to a track pitch P1). The pit 21 is modulated by a well-known modulation method and formed a pit in various length. A minimal pit length closely relating to quality of a reproduction signal is defined as L1. The groups of pit 21 can be meandered or wobbled by applying a sinusoidal deflection to the pit 21 when the pit 21 is recorded with cutting. It is acceptable that wobbling is recorded by either the CLV (constant linear velocity) or the CAV (constant angular velocity) method. Further, a specific code, which can not be rewritten by a user, is recorded in the read only area 31. The specific code is such a key or code as a key for ciphering, a key for deciphering, a code for permitting to record, a code for refusing to record, and a disk serial number inherent to each disk. In addition thereto, a lead-in signal can be recorded as a same manner as that of a current read only disk.

The microscopic patterns 12 in the recording/reproducing area 32 are composed of a group of groove 22. A gap between each groove 22 is called a land 23 commonly. Each groove 22 is spaced in a distance of P2 (hereinafter referred to a track pitch P2). The groove 22 can also be wobbled by applying a sinusoidal deflection to the groove 22 when the groove 22 is recorded with cutting. It is acceptable that wobbling is recorded by either the CLV or the CAV method. Further, an address pit, which specifies an address number, can be allocated in between each groove 22, that is, in the land 23.

Recording an information by a user is explained next.

Figure 6:
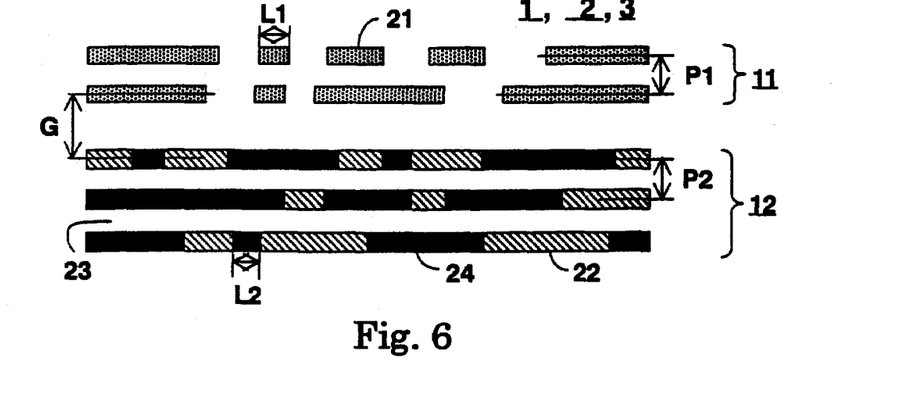
FIG. 6 is a plan view of a boundary area between a read only area and a recording/reproducing area of an information recording medium according to the present invention.

FIG. 6 is a plan view of the interface area as same as that of shown in FIG. 5 with showing a mark 24 written in the groove 22.

Figure 7:
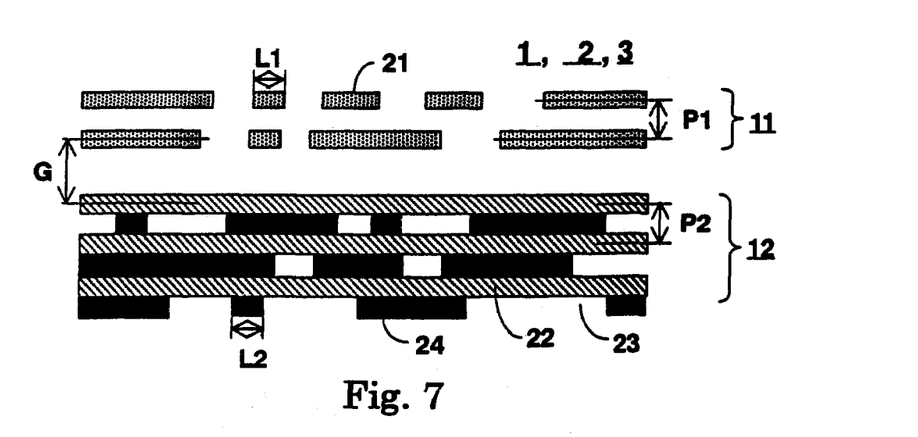
FIG. 7 is a plan view of a boundary area between a read only area and a recording/reproducing area of an information recording medium according to the present invention.

FIG. 7 is a plan view of the interface area as same as that of shown in FIG. 5 with showing the mark 24 written in the land 23.

Recording is performed as shown in FIG. 6. That is to say, the mark 24 is formed in the groove 22 by focusing a laser beam for recording on the groove 22. The mark 24 is modulated by a well-known modulating method, and then formed in various lengths. A minimal pit length closely relating to quality of a reproduction signal is defined as L2. As shown in FIG. 7, the mark 24 can be written in between each groove 22, that is, in the land 23. Further, the mark 24 can be written in both the groove 22 and the land 23 although not shown in any drawings.

The well-known modulation method applied for the read only and recording/reproducing areas 31 and 32 is a signal of which minimal mark length is specified to one of lengths such as 2T, 3T, 4T, and 5T. In a case of a signal system in which a minimal pit length or a minimal mark length is specified to 2T, for example, such a signal system as an eight to twelve (8/12) modulation, which is composed of signals from 2T to 8T, can be utilized. Further, in a case of a signal system in which a minimal pit length or a minimal mark length is specified to 3T, signal systems such as an eight to fourteen (8/14) modulation, an eight to fifteen (8/15) modulation, and an eight to seventeen (8/17) modulation, which are composed of signals from 3T to 11T, and another signal system such as an eight to sixteen (8/16) modulation, which is composed of signal from 3T to 11T and 14T, can be utilized. In these read only and recording/reproducing areas 31 and 32, each signal in the respective areas can be modulated by different modification methods. However, a same modification method is desirable to be employed, in consideration of convenience of a recording/reproducing apparatus. It is also desirable by the same reason that P1=P2 and L1=L2.

In order to enable a traverse reproduction over the read only area 31 and the recording/reproducing area 32, the depth d1 and d2 of respective areas of the information recording medium 1 according to the present invention are adjusted so as to enable to obtain a predetermined push-pull signal. A predetermined push-pull signal satisfies following inequalities simultaneously with defining that a push-pull signal output of the read only area 31 is T1 and a push-pull signal output of the recording/reproducing area 32 before recording is T2.

$T1 \geq 0.1$ $T2 \geq 0.1$ and $1.5 \geq T1/T2 \geq 0.5$.

Further, in order to stabilize a traverse reproduction over areas, respective push-pull signal outputs are desirable to be within a range of satisfying following inequalities simultaneously:

T1≧0.15

T2≧0.15 and 1.4≧T1/T2≧0.6.

A range of tracking signal of the information recording medium according to the present invention is obtained by a limiting value, which is obtained by reproducing the information recording medium actually loaded in a player by means of the push-pull method. A result of experiment is shown in Table 1. By examining tracking ability in the read only area 31 with respect to T1, tracking is completely disabled by T1 in less than 0.08.

TABLE 1

| T1 | Tracking |
| --- | --- |
| 0.08 | Disable |
| 0.10 | Enable |
| 0.15 | Enable |
| 0.18 | Enable |
| 0.25 | Enable |

Further, Table 2 shows a result of examining tracking ability in the recording/reproducing area 31 with respect to T2. Tracking is completely disabled by T2 in less than 0.08 as same situation as that of T1.

TABLE 2

| T2 | Tracking |
| --- | --- |
| 0.08 | Disable |
| 0.10 | Enable |
| 0.15 | Enable |
| 0.22 | Enable |
| 0.31 | Enable |
| 0.45 | Enable |

It is found by the above experiment that a value of both T1 and T2 must be more than 0.1. Furthermore, the value is desirable to be more than 0.15, in consideration of a case that the information recording medium 1 is dusted or scratched.

A limitation of continuous reproducibility over two areas is caused by that there is existed a limit in a dynamic range of a servo circuit of a recording apparatus. In other words, it is required that a difference between T1 and T2 is smaller. Therefore, with respect to the information recording medium 1, which satisfies the inequalities of T1≧0.1 and T2≧0.1, a limiting value is obtained by performing a traverse reproduction over two areas for various disk samples of T1/T2. A result is shown in Table 3 below. As shown in Table 3, the traverse reproduction over two areas is enabled in a case that T1/T2 is within a range from 0.5 to 1.5. However, the value is desirable to be within a range from 0.6 to 1.4, in consideration of a case that the information recording medium 1 is dusted or scratched.

TABLE 3

| T1 | T2 | T1/T2 | Traverse reproduction over areas |
| --- | --- | --- | --- |
| 0.10 | 0.10 | 1.0 | Enable |
| 0.10 | 0.20 | 0.5 | Enable |
| 0.10 | 0.25 | 0.4 | Disable |
| 0.15 | 0.22 | 0.7 | Enable |
| 0.20 | 0.12 | 1.7 | Disable |
| 0.20 | 0.13 | 1.5 | Enable |
| 0.20 | 0.28 | 0.7 | Enable |
| 0.20 | 0.40 | 0.5 | Enable |
| 0.20 | 0.45 | 0.4 | Disable |
| 0.22 | 0.16 | 1.4 | Enable |
| 0.25 | 0.16 | 1.6 | Disable |
| 0.25 | 0.17 | 1.5 | Enable |
| 0.25 | 0.25 | 1.0 | Enable |
| 0.25 | 0.34 | 0.7 | Enable |
| 0.25 | 0.44 | 0.6 | Enable |

A push-pull signal output is defined as follows: a push-pull signal is a signal, which is produced by calculating respective outputs from a 4-division photodetector utilized for a recording/reproducing apparatus as a pickup.

Figure 9:
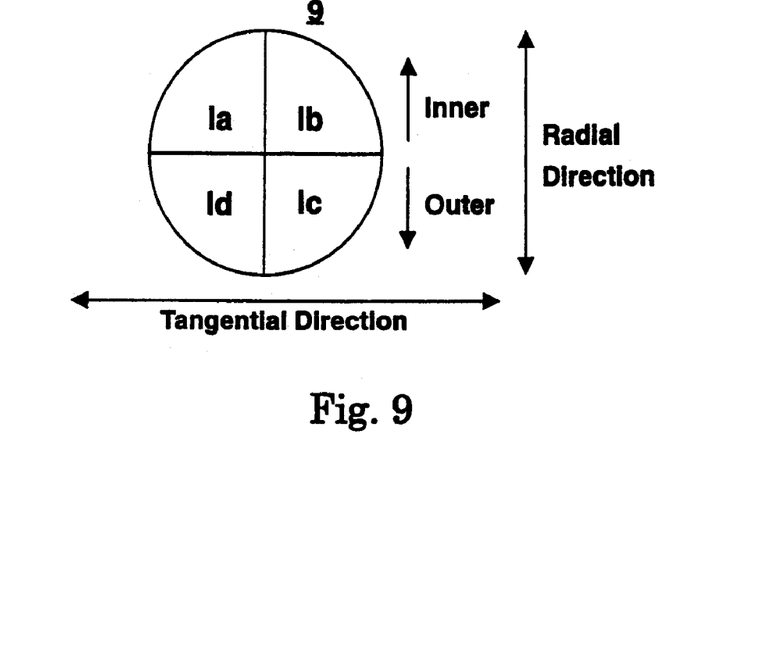
FIG. 9 is a cross sectional view of a 4-division photodetector utilized for recording and reproducing an information recording medium according to the present invention.

FIG. 9 is a cross sectional view of a 4-division photodetector 9 utilized for recording and reproducing the information recording medium 1 according to the present invention.

In FIG. 9, a horizontal and vertical axes are a radial direction and a tangential direction (track direction) respectively in corresponding to. FIGS. 5 through 7. Reproduced outputs of the 4-division photodetector 9 are Ia, Ib, Ic, and Id respectively. An output difference between an inner circumference side and an outer circumference side, that is, |(Ia+Ib)−(Ic+Id)| is measured by an AC (alternative current) coupling, and then total outputs, that is, |(Ia+Ib+Ic+Id)| is measured by a DC (direct current) coupling. A push-pull signal "T" is a ratio of these two values and defined as follows:

$$T=|(Ia+Ib)-(Ic+Id)|/|(Ia+Ib+Ic+Id)|.$$

As mentioned above, in the information recording medium 1 having at least the read only and recording/reproducing areas 31 and 32, in order to enable the traverse reproduction over two areas, the present invention specifies a push-pull signal output to a predetermined range.

First Embodiment

FIG. 1 is a plan view of an information recording medium in a disk shape according to an embodiment of the present invention.

Figure 4:
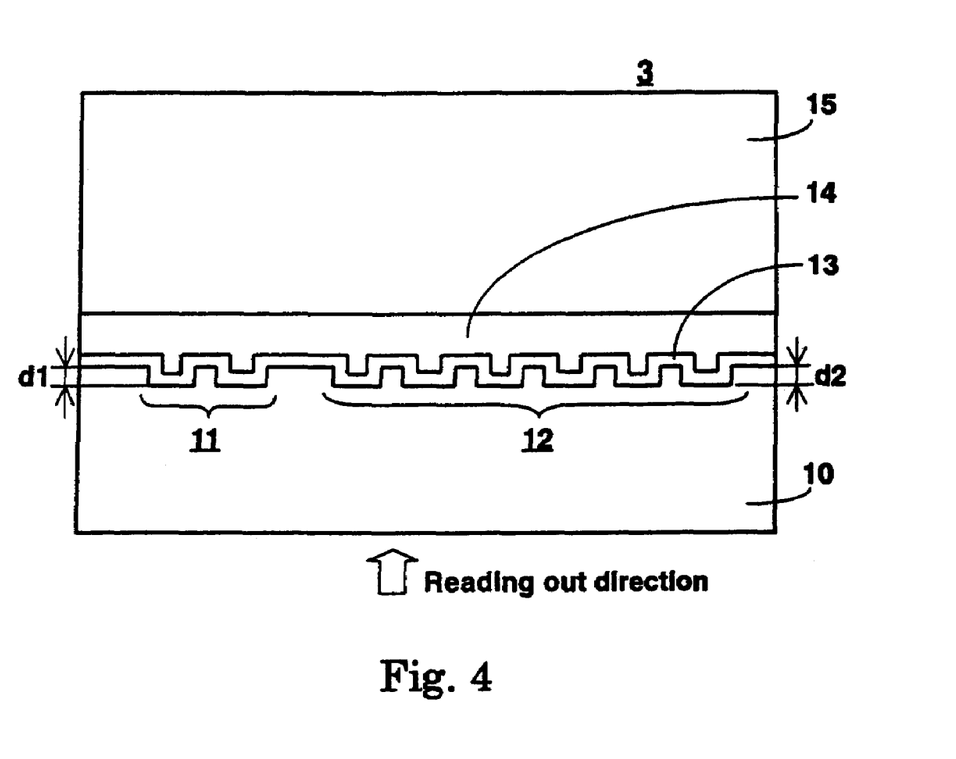
FIG. 4 is a cross sectional view of an information recording medium according to a first embodiment of the present invention.

FIG. 4 is a cross sectional view of the information recording medium shown in FIG. 1 according to a first embodiment of the resent invention.

In FIG. 1, an information recording medium 3 comprises a read only area 31 formed a ring shape in an inner circumference area and a recording/reproducing area 32 formed a ring shape in an area outside the read only area 31. As shown in FIG. 4, the information recording medium 3 comprises a substrate 10, a recording layer 13, a resin layer 14 and a dummy substrate 15. The resin layer 14 is adhered on the recording layer 13 with continuously covering over two areas including the read only area 31 and the recording/reproducing area 32. The substrate 13 comprises polycarbonate of which a refractive index "n" is 1.58 at a wavelength λ of 650 nm. The recording layer 13 comprises a phase change material having a reflectivity of more than 15% such as an alloy of antimony, tellurium, and a metal having a melting point of less than 1100° C. Actually, the alloy is composed of silver, indium, antimony, and tellurium (AgInSbTe), for example. The alloy is sandwiched by dielectric such as ZnSSiO and further laminated by a reflection film of an aluminum alloy, and then they are formed as a recording layer having a reflectivity of 18 to 30%. The resin layer 14 comprises an ultra violet curable resin and is adhered to the dummy substrate 15 with laminated.

Figure 8:
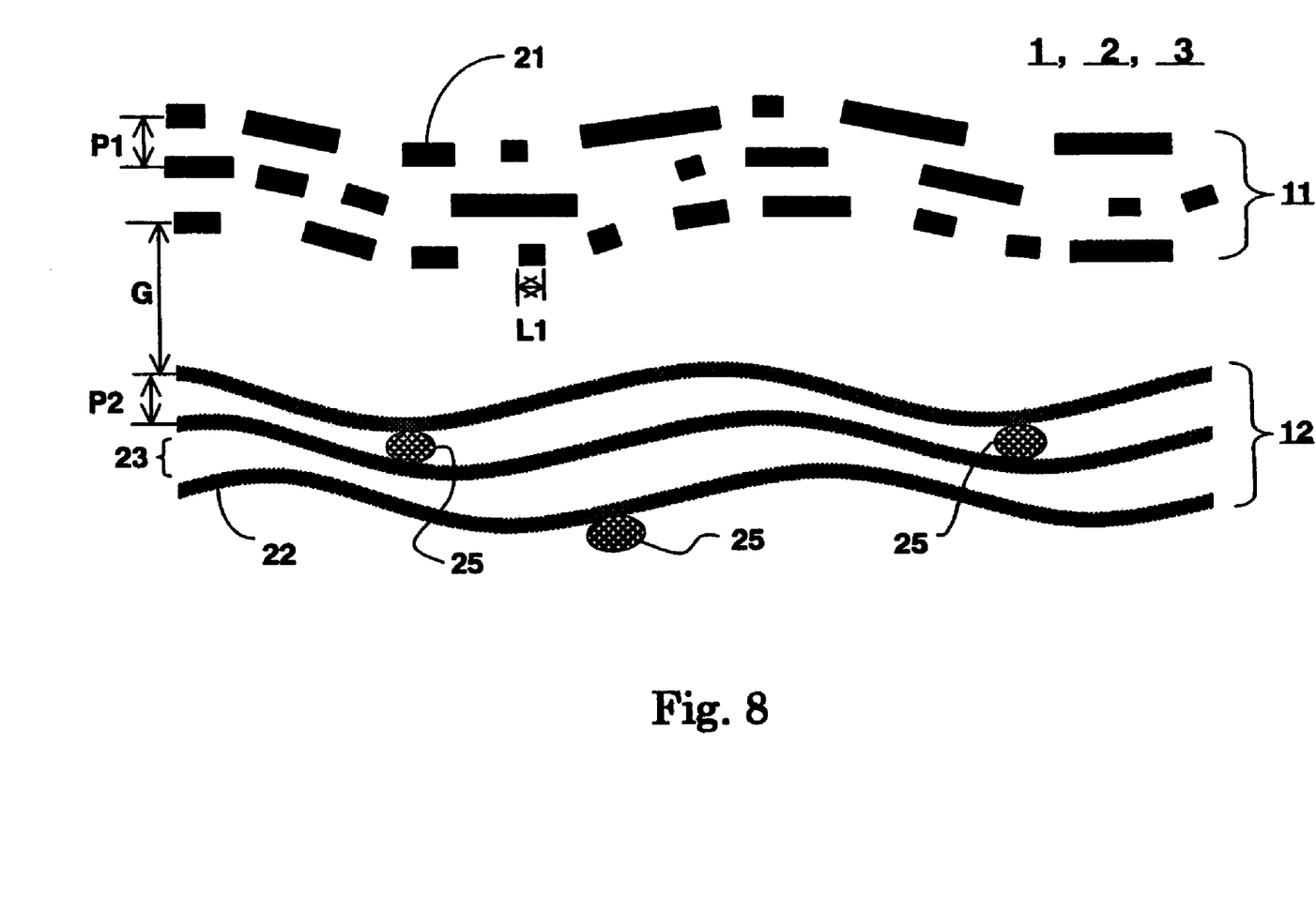
FIG. 8 is a plan view of a boundary area between a read only area and a recording/reproducing area of an information recording medium according to the present invention.

FIG. 8 is a plan view of microscopic patterns 11 and 12 formed on the substrate 10 typically before recording information.

In FIG. 8, a gap "G" between the microscopic pattern 11 and 12, that is, a gap "G" between the read only area 31 and the recording/reproducing area 32 is 25 μm. The microscopic patterns 11 corresponding to the read only area 31 is recorded spirally by the CLV method, that is, a group of pit 21, which is wobbled sinusoidally. A width of wobbling is 0.009 to 0.017 μm. An average track pitch P1 of the microscopic patterns 11 is 0.74 μm. With respect to a modification method of the read only area 31, the 8/16-modification method is utilized. A minimal pit length of the pit 21 is 0.4 μm.

On the other hand, the recording/reproducing area 32 is composed of a sinusoidally wobbled groove 22 and an address pit 25 formed on a land 23, which is provided between each groove 22 with being adjacent to a groove wall. These groove 22 and address pit 25 is also formed in a spiral. A width of wobbling is 0.009 to 0.017 μm. An average track pitch P2 of the microscopic patterns 12 is 0.74 μm. In addition thereto, the address pit 25 is a pit recorded with an address, which is useful when recording, and is recorded throughout the information recording medium from an innermost circumference area to an outermost circumference area in accordance with a certain rule. Recording is performed by forming a mark (not shown) in the groove 22. With respect to a recording modulation method of the recording/reproducing area 32, the 8/16-modulation method is utilized as same as that of the read only area 31. A minimal pit length L2 (not shown) of a recorded mark in the groove 2 is 0.4 μm as a same length as the minimal pit length L1.

When such the information recording medium is reproduced by using a pickup having a wavelength λ of 650 nm and a numerical aperture NA of 0.6, in order to accomplish a range of push-pull signal output, that is, T1≧0.1, T2≧0.1, and 1.5≧T1/T2≧0.5, it is effective to optimize depths d1 and d2 of the microscopic patterns 11 and 12 in the read only area 31 and the recording/reproducing area 32 respectively.

Figure 10:
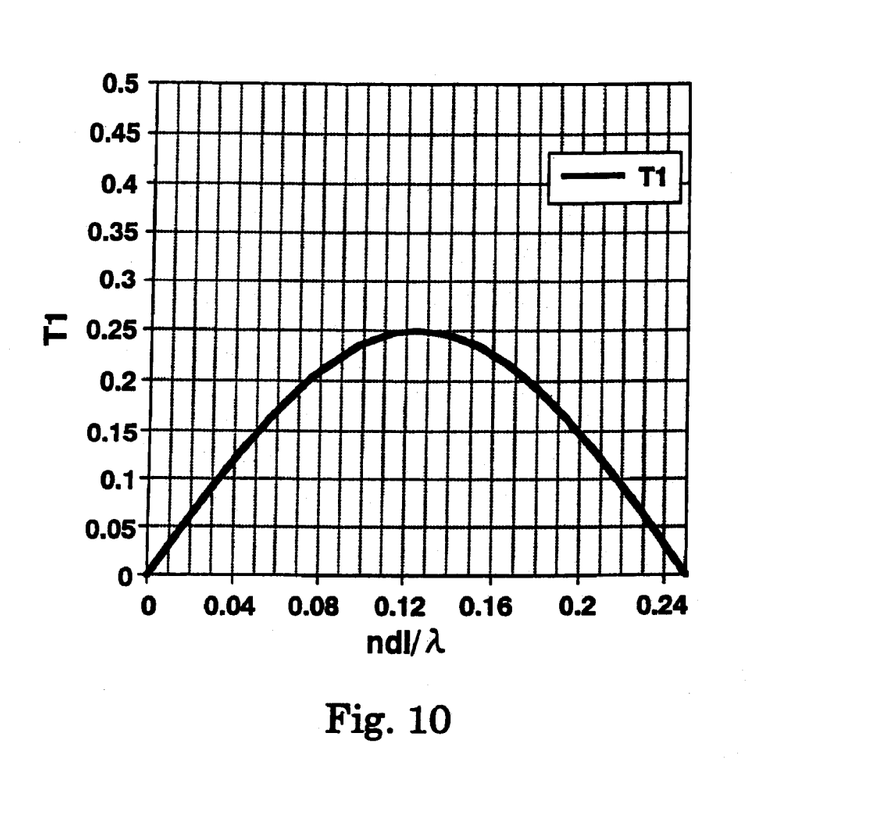
FIG. 10 is a graph showing a relation between a depth of a read only area of an information recording medium and a push-pull signal output according to the present invention.

FIG. 10 is a graph showing a relation between the depth d1 of the read only area 31 of the information recording medium and a push-pull signal output T1 according to the present invention. A vertical and horizontal axes represent a value of (d1×n) divided by λ, that is, (nd1/λ) and a push-pull signal output T1 respectively. The T1 is defined by the sine function of the P1. According to FIG. 10, the (nd1/λ) is specified to 0.03 through 0.22 so as to realize T1≧0.1. Further, a reproduction jitter, which is fluctuation in a time axis direction, decreases as far as the (nd1/λ) approaches to 0.25, so that it is proper for the (nd1/λ) to be 0.12 through 0.22 in a depth.

Figure 11:
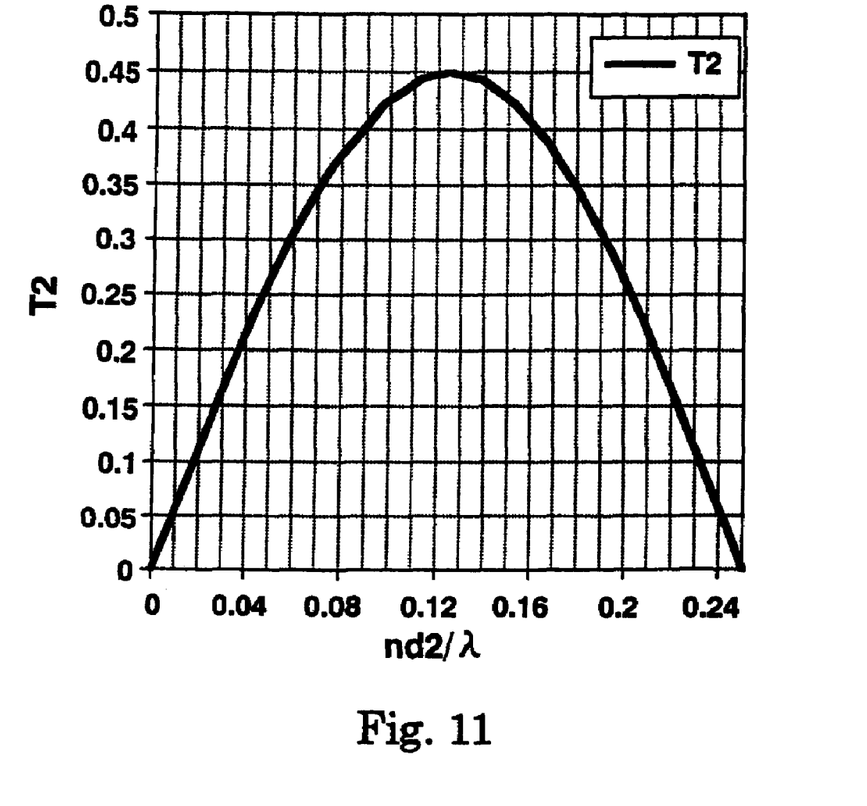
FIG. 11 is a graph showing a relation between a depth of a recording/reproducing area of an information recording medium and a push-pull signal output according to the present invention.

FIG. 11 is a graph showing a relation between the depth d2 of the recording/reproducing area 32 of the information recording medium and a push-pull signal output T2 according to the present invention. The T2 is defined by the sine function of the P2 as same as the T1. However, in a case of a groove, a value of the T2 is approximately twice a value of the T1. According to FIG. 11, the (nd2/λ) is specified to 0.02 through 0.23 so as to realize T2≧0.1. Further, when the information recording medium is recorded and reproduced, a jitter decreases in conjunction with reflectivity, which increase, as far as the (nd2/λ) approaches to zero, so that it is proper for the (nd2/λ) to be 0.02 through 0.12 in a depth.

Furthermore, a reproduction jitter can be obtained in accordance with the Annex "F" of JIS-X-6241 (Japanese Industrial Standard). According to the Standard, a jitter is required to be not more than 8%. In other words, if a jitter exceeds 8%, reading out a reproduction signal is seriously affected by disturbance such as disk tilt. By recording and reproducing practically, and by optimizing the depths d1 and d2, ranges of (nd1/λ) and (nd2/λ) are as follows:

(nd1/λ) is within a range from 0.17 to 0.22, wherein the T1 is 0.1 through 0.22, and (nd2/λ) is within a range from 0.02 to 0.10 wherein the T2 is 0.1 through 0.42.

With referring to FIGS. 10 and 11, (nd1/λ) and (nd2/λ) can be selected out from the ranges shown above so as for the T1/T2 to be 0.5 through 1.5. It is specified that (nd1/λ)=0.17 and (nd2/λ)=0.06 in this embodiment. In this case, T1=0.22 and T2=0.31, and then it is obtained that T1/T2=0.7. Accordingly, the push-pull conditions of the present invention such that T1≧0.1, T2≧0.1, and 1.5≧T1/T2≧0.5 can be sufficiently satisfied. Further, reproduction jitter in the read only area 31 and the recording/reproducing area 32 are 7.9% and 6.2% respectively. Both jitter values sufficiently satisfy the standard. Furthermore, by continuously reproducing two areas, it is confirmed that a continuous reproduction can jump across the two areas without any problems.

Second Embodiment

Parameters of this embodiment are a same as those of the first embodiment except for (nd1/λ)=0.18 and (nd2/λ)=0.08. Further, the gap "G" between the read only area 31 and the recording/reproducing area 32 are specified to 20 μm. By these parameters, it is obtained that T1=0.19 and T2=0.37, and then T1/T2=0.5 is obtained. Accordingly, the push-pull conditions of he present invention such that T1≧0.1, T2≧0.1, and 1.5≧T1/T2≧0.5 can be satisfied. Further, reproduction jitter in the read only area 31 and the recording/reproducing area 32 are 7.1% and 6.5% respectively. Both jitter values sufficiently satisfy the standard. Furthermore, by continuously reproducing two areas, it is confirmed that a continuous reproduction can jump across the two areas without any problems.

Third Embodiment

Parameters of this embodiment are a same as those of the first embodiment except for (nd1/λ)=0.175 and (nd2/λ)=0.067. Further, the gap "G" between the read only area 31 and the recording/reproducing area 32 are assigned to 0.74 μm, which is the same value as P1 and P2. By these parameters, it is obtained that T1=0.20 and T2=0.33, and then T1/T2=0.6 is obtained. Accordingly, the push-pull conditions of the present invention such that T1≧0.1, T2≧0.1, and 1.5≧T1/T2≧0.5 can be satisfied. Further, reproduction jitter in the read only area 31 and the recording/reproducing area 32 are 7.5% and 6.3% respectively. Both jitter values sufficiently satisfy the standard. Furthermore, by continuously reproducing two areas, it is confirmed that a continuous reproduction can be performed without stopping at a boundary between two areas.

Fourth Embodiment

Parameters of this embodiment are a same as those of the first embodiment except for (nd1/λ)=0.2 and (nd2/λ)=0.04. Further, the gap "G" between the read only area 31 and the recording/reproducing area 32 are assigned to 0.74 μm, which is he same value as P1 and P2. By these parameters, it is obtained that T1=0.15 and T2=0.22, and then T1/T2=0.66 is obtained. Accordingly, the push-pull conditions of the present invention such that T1≧0.1, T2≧0.1, and 1.5≧T1/T2≧0.5 can be satisfied. Further, reproduction jitter in the read only area 31 and the recording/reproducing area 32 are 6.8% and 5.8% respectively. Both jitter values sufficiently satisfy the standard. Furthermore, by continuously reproducing two areas, it is confirmed that a continuous reproduction can be performed without stopping at a boundary between two areas.

Fifth Embodiment

Parameters of this embodiment are a same as those of the first embodiment except for (nd1/λ)=0.17 and (nd2/λ)=0.04. Further, the gap "G" between the read only area 31 and the recording/reproducing area 32 are assigned to 0.74 μm, which is the same value as P1 and P2. By these parameters, it is obtained that T1=0.22 and T2=0.22, and then T1/T2=1.0 is obtained. Accordingly, the push-pull conditions of the present invention such that T1≧0.1, T2≧0.1, and 1.5≧T1/T2≧0.5 can be satisfied. Further, reproduction jitter in the read only area 31 and the recording/reproducing area 32 are 7.9% and 5.9% respectively. Both jitter values sufficiently satisfy the standard. Furthermore, by continuously reproducing two areas, it is confirmed that a continuous reproduction can be performed without stopping at a boundary between two areas.

Sixth Embodiment

Parameters of this embodiment are a same as those of the first embodiment except for (nd1/λ)=0.17 and (nd2/λ)=0.03. Further, the gap "G" between the read only area 31 and the recording/reproducing area 32 are assigned to 0.74 μm, which is the same value as P1 and P2. By these parameters, it is obtained that T1=0.22 and T2=0.167, and then T1/T2=1.4 is obtained. Accordingly, the push-pull conditions of the present invention such that T1≧0.1, T2≧0.1, and 1.5≧T1/T2≧0.5 can be satisfied. Further, reproduction jitter in the read only area 31 and the recording/reproducing area 32 are 7.9% and 5.5% respectively. Both jitter values sufficiently satisfy the standard. Furthermore, by continuously reproducing two areas, it is confirmed that a continuous reproduction can be performed without stopping at a boundary between two areas.

Seventh Embodiment

Parameters of this embodiment are a same as those of the first embodiment except for (nd1/λ)=0.17 and (nd2/λ)=0.028. Further, the gap "G" between the read only area 31 and the recording/reproducing area 32 are assigned to 0.74 μm, which is the same value as P1 and P2. By these parameters, it is obtained that T1=0.25 and T2=0.158, and then T1/T2=1.5 is obtained. Accordingly, the push-pull conditions of the present invention such that T1≧0.1, T2≧0.1, and 1.5≧T1/T2≧0.5 can be satisfied. Further, reproduction jitter in the read only area 31 and the recording/reproducing area 32 are 7.9% and 5.4% respectively. Both jitter values sufficiently satisfy the standard. Furthermore, by continuously reproducing two areas, it is confirmed that a continuous reproduction can be performed without stopping at a boundary between two areas.

Eighth Embodiment

An embodiment of the information recording medium, which is recorded or reproduced by using a blue semiconductor laser beam having a wavelength λ of 405 nm is explained next as an expanded embodiment of the present invention. An information recording medium 2 has a cross sectional configuration shown in FIG. 3. The information recording medium 2 comprises a substrate 10 composed of polycarbonate, a recording layer 13 composed of a phase change material having reflectivity of more than 10%, particularly, an alloy composed of antimony, tellurium, and a metal having a melting point of less than 1100° C., and a resin layer 14. Further, the recording layer 13 actually comprises an alloy composed of silver, indium, antimony, and tellurium (AgInSbTe), for example. The alloy is sandwiched by dielectric such as ZnS-SiO and further laminated by a reflection film of an aluminum alloy, and then they are formed as a recording layer having a reflectivity of 10 to 25%. The resin layer 14 comprises polycarbonate having a refractive index "n" of 1.6 at the wavelength λ of 405 nm.

Microscopic patterns on a surface of the substrate 10 in both the read only area 31 and the recording/reproducing area 32 are recorded spirally by the CAV method with being wobbled sinusoidally. Other parameters are the same as those of the first embodiment except for an average track pitch such that P1 and P2 is 0.374 μm, wherein respective width of wobbling is 0.006 to 0.011 μm. With respect to a modification method, the D8/15-modification method, which is one variation of the 8/15-modulation method and disclosed in the Japanese: Patent Application No 11-23316/1999, is utilized. A minimal pit length L1 and a minimal mark length L2 is 0.2 μm respectively.

Parameters in the read only and recording/reproducing areas 31 and 32 are specified to (nd1/λ)=0.18 and (nd2/λ)=0.08 respectively. Further, the gap "G" between the read only area 31 and the recording/reproducing area 32 are specified to 0.374 μm, which is the same value as P1 and P2. By these parameters, it is obtained that T1=0.19 and T2=0.38, and then T1/T2=0.5 is obtained. Accordingly, the push-pull conditions of the present invention such that T1≧0.1, T2≧0.1, and 1.5≧T1/T2≧0.5 can be satisfied. Further, by continuously reproducing two areas, it is confirmed that a continuous reproduction can jump across the two areas without any problems.

Ninth Embodiment

Parameters of this embodiment are a same as those of the seventh embodiment except for (nd1/λ)=0.17 and (nd2/λ)=0.028. Further, the gap "G" between the read only area 31 and the recording/reproducing area 32 are assigned to 0.374 μm, which is the same value as P1 and P2. By these parameters, it is obtained that T1=0.26 and T2=0.17, and then T1/T2=1.5 is obtained. Accordingly, the push-pull conditions of the present invention such that T1≧0.1, T2≧0.1, and 1.5≧T1/T2≧0.5 can be satisfied. Further, by continuously reproducing two areas, it is confirmed that a continuous reproduction can be performed without stopping at a boundary between two areas.

While the invention has been described above with reference to specific embodiments thereof, it is apparent that many changes, modifications and variations in the arrangement of equipment and devices and in materials can be made without departing from the invention concept disclosed herein.

Figure 12:
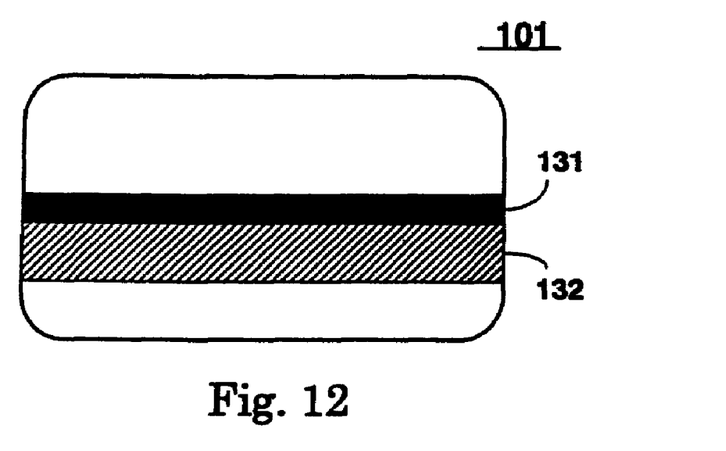
FIG. 12 is a plan view of an information recording medium in a card shape according to the present invention.

FIG. 12 is a plan view of an information recording medium in a card shape according to the present invention.

Figure 13:
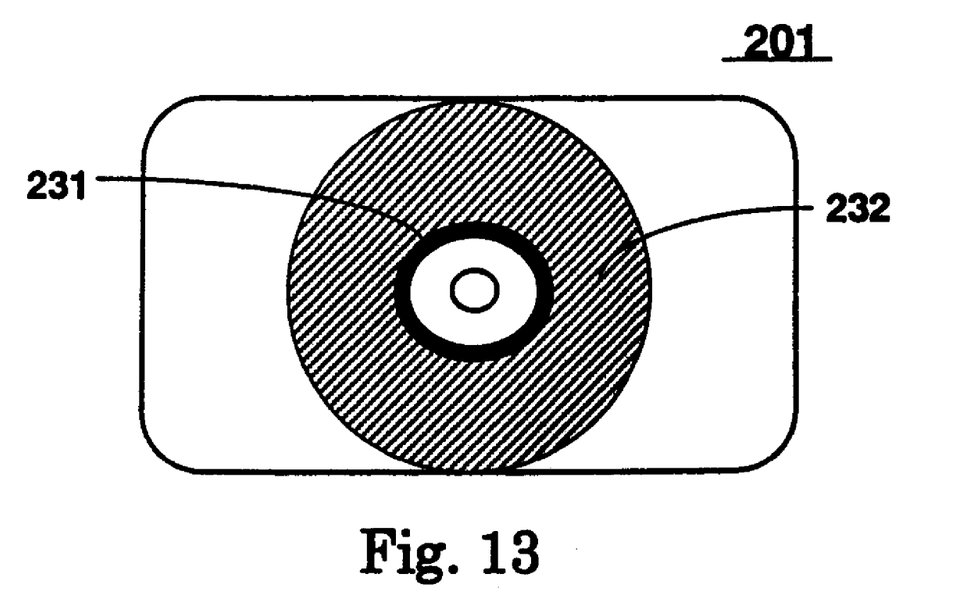
FIG. 13 is a plan view of another information recording medium in a card shape according to the present invention.

FIG. 13 is a plan view of another information recording medium in a card shape according to the present invention.

Each composing element in some embodiments shown by drawings can be interchanged or replaced by other composing element described in the specification. For example, in the first and second embodiments, the information recording medium is exemplified by a disk shaped one. However, as shown in FIG. 12, an information recording medium 101 in a card shape provided with a read only area 131 in a stripe and a recording/reproducing area 132 in a stripe can be utilized. Further, as shown in FIG. 13, an information recording medium 201 in a card shape provided with a read only area 231 in a ring shape and a recording/reproducing area 232 in a ring shape can also be utilized.

Furthermore, in the first and second embodiments, a phase change recording material is utilized for the recording layer 13. However, the material is not limited to a phase change recording material. A magneto-optical recording material and a recordable type recording material such as a dye material can also be utilized.

More, a wavelength of a laser beam utilized for reproducing or recording/reproducing is specified as 650 and 405 nm. However, a wavelength is not limited to them. Any length such as 830, 635, 515, 460, 430, and 370 nm, and their adjacent wavelength can be utilized. Moreover, with respect to a numerical aperture NA of a lens, any NA such as 0.4, 0.45, 0.55, 0.65, 0.7, 0.75, 0.8, 0.85, and 0.9 other than 0.60 can be applicable. In addition thereto, a lens having an NA of more than 1.0, which is represented by a solid immersion lens, can also be applicable.

According to an aspect of the present invention, as depicted above, the information recording medium, which comprises at least the read only area 31 and the recording/reproducing area 32, can perform a traverse reproduction over two areas by specifying push-pull signal outputs from the read only area 31 and the recording/reproducing area 32 to a predetermined range.

What is claimed is:

1. An information recording medium comprising at least a substrate, and a recording layer,
    wherein said substrate is formed with a read only area and a recording/reproducing area, and wherein said read only area and said recording/reproducing area do not overlap with each other, and
    wherein said read only area is composed of a group of pits, and
    wherein a reflectivity of said recording layer is more than 10%, and
    wherein said recording layer is formed continuously over at least two areas of said read only area and said recording/reproducing area, and
    wherein a push-pull signal output T1 reproduced from said read only area is more than 0.1 and another push-pull signal output T2 reproduced from said recording/reproducing area is more than 0.1, and wherein $1.5 \geq T1/T2 \geq 0.5$, and
    wherein said group of pits is wobbled sinusoidally.

2. A reproducing method for reproducing an information recording medium comprising at least a substrate, and a recording layer,
    wherein said substrate is formed with a read only area and a recording/reproducing area, and wherein said read only area and said recording/reproducing area do not overlap with each other, and
    wherein said read only area is composed of a group of pits, and
    wherein a reflectivity of said recording layer is more than 10%, and
    wherein said recording layer is formed continuously over at least two areas of said read only area and said recording/reproducing area, and
    wherein a push-pull signal output T1 reproduced from said read only area is more than 0.1 and another push-pull signal output T2 reproduced from said recording/reproducing area is more than 0.1, and wherein $1.5 \geq T1/T2 \geq 0.5$, and
    wherein said group of pits is wobbled sinusoidally.
    said reproducing method characterized in that
    reproducing is conducted by irradiating a laser beam on said recording layer.

* * * * *